United States Patent [19]
Spencer, deceased et al.

[11] Patent Number: 5,192,602
[45] Date of Patent: Mar. 9, 1993

[54] LOUVERED FILTER AND PAINT ARRESTOR

[76] Inventors: Victor V. Spencer, deceased, late of Tillsonburg; by Mary Spencer, executrix, 4 Highland Drive, Tillsonburg, Ontario, both of Canada, N4G 2E9; Leonid A. Bagrin, 257 Burlington Street, London, Ontario, Canada, N5Z 3W3

[21] Appl. No.: 699,657

[22] Filed: May 14, 1991

[51] Int. Cl.$^5$ .......................... B32B 3/28; B03C 11/11
[52] U.S. Cl. ...................................... 428/179; 428/175; 428/178; 428/182; 428/184; 428/186; 428/188; 52/796; 55/521; 118/504; 118/505
[58] Field of Search ............... 428/182, 174, 179, 184, 428/186, 175, 188, 178, 192, 212, 286, 332, 535, 537.5; 52/473, 795, 796, 518; 55/500, 521, 529, 497; 118/504, 505

[56] References Cited

U.S. PATENT DOCUMENTS

3,941,571  3/1976  Getzin ................................ 428/182
4,588,631  5/1986  Clark .................................. 428/182

*Primary Examiner*—Donald J. Loney
*Attorney, Agent, or Firm*—Mitches & Co.

[57] ABSTRACT

A filter is disclosed which employs two panels of single-faced corrugated paperboard cut into strips or runs, each strip or run glued in an overlaying fashion relative to the one juxtaposed thereto so that the longitudinal axis defined by each corrugation, lies at an angle relative to the plane of the panel of between 45° and 75°. Two such panels are reversingly juxtaposed into an abutting relationship in one embodiment, and against a medial gauze media in another embodiment, to form a novel filter media suitable as a paint arrestor, coating arrestor or the like.

11 Claims, 1 Drawing Sheet

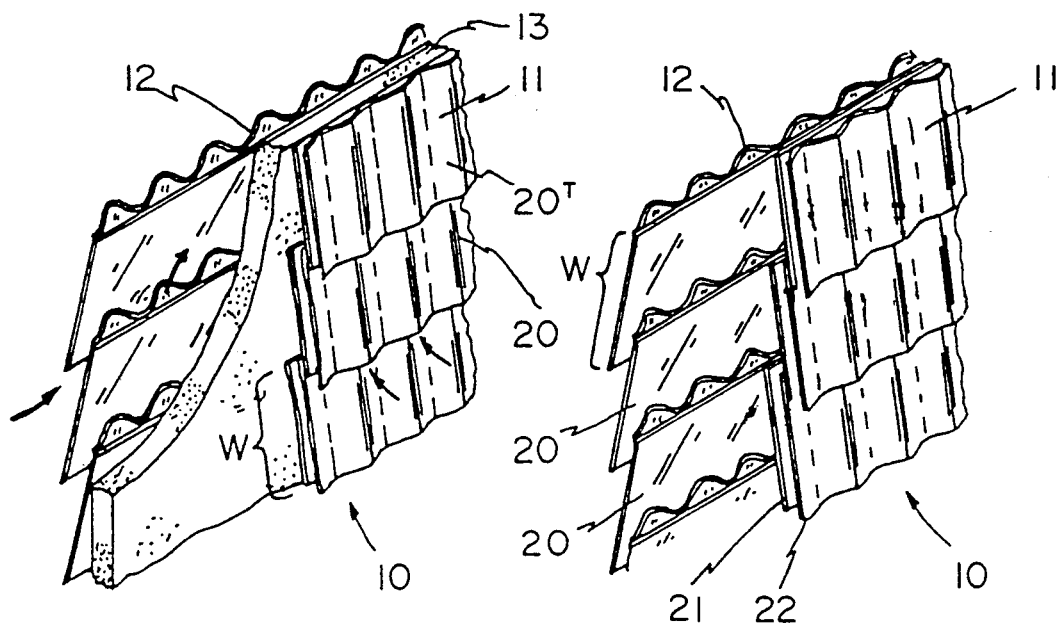
FIG. 1
FIG. 2
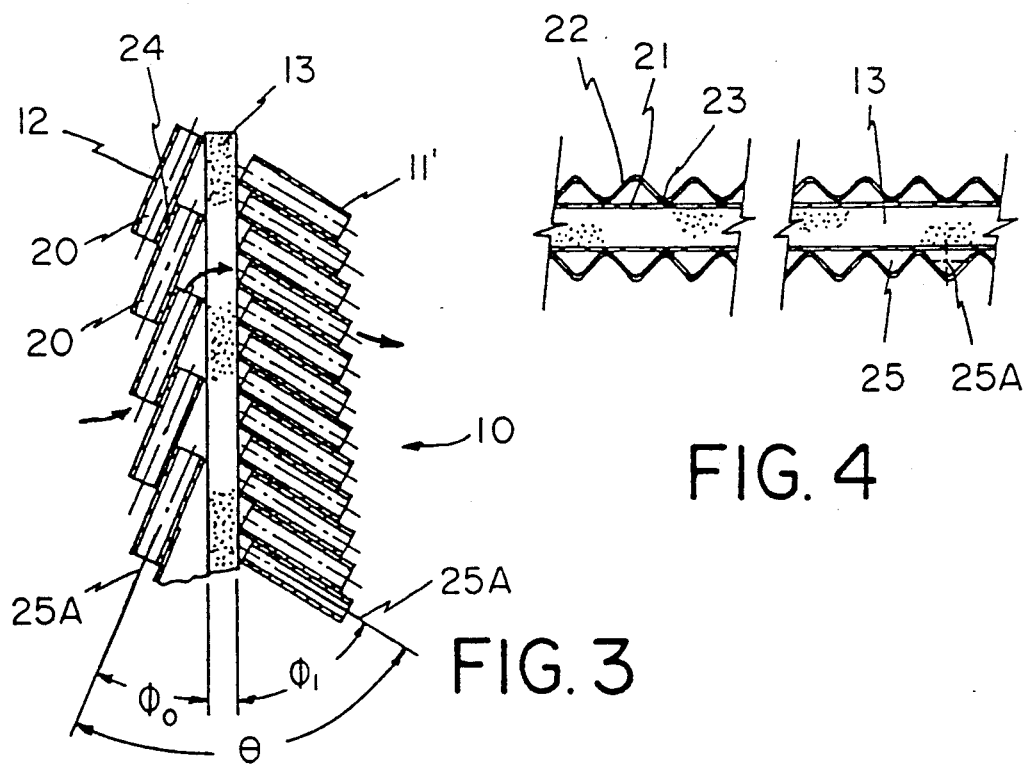
FIG. 3
FIG. 4

LOUVERED FILTER AND PAINT ARRESTOR

BACKGROUND OF THE INVENTION

This invention relates to a filter media.

Particularly, the novel filter media is adapted and suitable as a paint arrestor for paint overspray or, as an arrestor for powder overspray, adhesive overspray or other overcoating overspray which takes place when a coating is applied to an article.

Paint arrestors which are used in paint booths and the like are important for the safety of the worker. Most have been constructed from honeycomb in multi-ply forms.

SUMMARY OF THE INVENTION

Honeycomb arrestors are fragile and are not self-sustaining or self-supporting.

It is an object of this invention to create a self-sustaining and self-supporting multi-ply paint arrestor, employing, in a novel way, corrugated strips, particularly paperboard corrugated strips, particularly single-faced strips.

Single-faced paperboard corrugated strips consist, of a flat paper sheet as a substrate sheet, and a corrugated paper sheet adhesively affixed thereto to provide corrugations that define channels between the two sheets. The single-faced corrugated sheet is cut into strips which are then tiered to form a family of overlaying tiered corrugated channels so that the longitudinal axis of each channel is generally at an acute angle, relative to the plane of the panel.

A pair of such panels are reversingly placed in juxtaposition so that the family of axes of one panel intersects that of the other panel at an angle $\theta$, which is nearly orthogonal.

In a variant of the arrestor, a gauze material is bounded by two similarly structured paint arrestors.

A filter media is disclosed which employs two panels of single-faced corrugated paperboard cut into strips or runs, each strip or run glued in an overlaying fashion relative to the one juxtaposed thereto so that the longitudinal axis defined by each corrugation, lies at an angle relative to the plane of the panel of between 45° and 75°. Two such panels are reversingly juxtaposed into an abutting relationship in one embodiment, and against a medial gauze media in another embodiment, to form a novel filter media suitable as a paint arrestor, coating arrestor or the like. The invention therefore contemplates claim 1.

BRIEF DESCRIPTION OF THE DRAWINGS

The invention will now be described and by way of example and reference to the accompanying drawings wherein:

FIG. 1 is a perspective view, partially broken away, of an embodiment of the invention, with gauze.

FIG. 2 is a perspective view of an alternative embodiment of the invention, without gauze.

FIG. 3 is an end view of a variant of the embodiment of FIG. 1, with gauze.

FIG. 4 are sectional views orthogonal to the longitudinal axis of each corrugated cell.

DESCRIPTION OF THE PREFERRED EMBODIMENTS

Referring to FIG. 1, a filter 10, according to the invention, consists of at least two generally parallel panels 11 and 12 which in two of the embodiments, FIGS. 1 and 3, are juxtaposed against an inner gauze sheet 13. The gauze sheet 13 is composed of expanded synthetic material such as expanded polyester media or other synthetic or natural open-celled media.

Each of the panels 11 and 12 are formed from a plurality of corrugated, faced overlapping or tiered runs 20. Each run 20 is composed of a flat lower base sheet 21 onto which is glued 23, a corrugated paper sheet 22. Each run 20 overlays the subjacent run and is glued 24, there by an adhesive 23.

Each panel 11 and 12 is oriented so the uppermost run $20^T$ has no overlaying run and in this way, the channels defined by each corrugation, generally shown as 25, have their longitudinal axis 25A parallel within each panel 11' and which respectively intersect at an acute angle $\phi$, preferably in the range of 45° to 75°, relative the plane of the panel, see FIG. 3. When two panels are reversingly juxtaposed, as seen in the FIG. 3, for an operative orientation, the combined angle of each panel, $5_0$ or $5_1$, totals the angle $\theta$ which preferably lies in the range of 90° to 145°. It is not necessary that each panel 11 and 12, have the same value to the inclination angle $\theta$. This is seen in FIG. 3. Where the inclination angle $\theta$, is large; i.e., approaches 75°, as that of $\phi_1$ in FIG. 3, there are of necessity, more "runs" for any given area of filter; hence, more channels 25 offering less resistant to the airflow, but more corrugation surfaces against which paint and other entrained material in the airflow can attach.

In the embodiment of FIGS. 1 and 2, the width W of each run 20 is approximately 2 inches and the overlay, ¼ of an inch while in the embodiment shown in FIG. 3, the runs are of the same width but the overlay of panel 11' approximates 1¼ inches and increases the angle of inclination of the longitudinal axis 25A to $\phi_1$ from $\phi_0$; $\phi_0$ is the angle of inclination of panel 12 of the channel 25 to the plane of the panel.

In the embodiment of FIGS. 1, 3 and 4, there is interposed between each panel 11 and 12 or, 11' and 12, a gauze-like material composed of expanded polyester.

In the embodiment of FIG. 2, the gauze is not provided.

What is claimed is:

1. A filter suitable as a paint arrestor comprising: a panel formed from a plurality of overlaying runs, each run formed of a single-faced corrugated material comprising, a flat substrate sheet and an overlaying corrugated sheet juxtaposed to the substrate sheet so that the two sheets define therebetween a family of channels each with an axis of said channel oriented at an acute angle relative to the medial plane of the panel.

2. The filter as claimed in claim 1, wherein the filter comprises at least a pair of panels relatively juxtaposed such that the axis of the channels of each panel generally intersect at an acute angle.

3. The filter as claimed in claim 1, wherein the filter comprises at least a pair of panels relatively juxtaposed such that the axis of the channels of each panel at an angle in the range of 90° to 140°.

4. The filter as claimed in claim 2, wherein the panels are formed from paper or paperboard.

5. The filter as claimed in claim 3, wherein a gauze material is interposed between each panel.

6. The filter as claimed in claim 5, wherein the gauze media is selected from an expanded synthetic or natural material.

7. The filter as claimed in claim 5, wherein the gauze media is selected from an expanded polyester media.

8. The filter as claimed in claim 3, wherein the panels are formed from paper or paperboard.

9. The filter as claimed in claim 8, wherein a gauze material is interposed between each panel.

10. The filter as claimed in claim 9, wherein the gauze media is selected from an expanded synthetic or natural material.

11. The filter as claimed in claim 9, wherein the gauze media is selected from an expanded polyester media.

* * * * *